United States Patent [19]

Esposito

[11] Patent Number: 4,671,027
[45] Date of Patent: Jun. 9, 1987

[54] METHOD AND CONSTRUCTION FOR A GREENHOUSE OR THE LIKE INCORPORATING SPLIT GLAZING BARS SUITABLE FOR CURVED SECTIONS

[75] Inventor: Christopher Esposito, Farmingdale, N.Y.

[73] Assignee: Four Seasons Solar Products Corporation

[21] Appl. No.: 685,402

[22] Filed: Jul. 14, 1986

[51] Int. Cl.⁴ .................. E04B 1/32; E04B 7/02; A01G 9/00
[52] U.S. Cl. ..................... 52/86; 29/155 R; 47/17; 52/90; 52/93; 52/105; 52/173 R; 52/461; 52/580; 52/741; 206/321
[58] Field of Search .............. 52/86, 90, 93, 395, 52/461, 463, 580, 741, 742, 105 R, 173 R; 29/155 R; 206/321; 47/17

[56] References Cited

U.S. PATENT DOCUMENTS

| 252,375 | 1/1882 | Hayes | 52/90 X |
|---|---|---|---|
| 1,074,895 | 10/1913 | Rapp | 52/461 X |
| 1,093,937 | 4/1914 | Kraft | 52/395 X |
| 2,624,427 | 1/1953 | Jacobs | 52/93 |
| 2,788,122 | 4/1957 | Kennedy | 206/321 |
| 3,057,444 | 10/1962 | Walberg | 52/461 |
| 3,071,215 | 1/1963 | Gall | 52/395 |
| 3,553,918 | 1/1971 | Danson | 52/395 |
| 4,070,806 | 1/1978 | Hubbard | 52/395 X |
| 4,372,014 | 2/1983 | Simpson | 52/105 X |
| 4,461,134 | 7/1984 | Lowe | 29/155 R X |
| 4,583,333 | 4/1986 | Minter | 52/90 |
| 4,606,157 | 8/1986 | Esposito | 52/173 R |

FOREIGN PATENT DOCUMENTS

652208  2/1963  Italy .......................... 52/90

Primary Examiner—Alfred C. Perham
Attorney, Agent, or Firm—Roberts, Spiecens & Cohen

[57] ABSTRACT

A greenhouse construction is provided which includes adjacent panels, each including a front wall section, a sloped roof section and a curved section which is located between and connects the front wall and sloped roof sections to form a continuous module. Each panel includes and is laterally bordered by glazing bar sections and glazing is provided which extends between these sections. The glazing is, at least in part, supported by the glazing bar sections and includes a curved glazing section corresponding to and constituting at least a part of the curved section of the associated panel. One of the galzing bar sections of each panel abuts the corresponding glazing bar section of the next adjacent panel and is in mirror image and matched relationship therewith. Together the glazing bar sections cooperatively form a glazing bar. The abutting glazing bar sections include matched curved sections which can be matched by being bent simultaneously by a common bending force. The abutting glazing bar sections are coded to indicate a match relationship therebetween. The modules are prefabricated and can be shipped to a site for installation whereat the glazing bar sections appropriately matched are brought into abutting relationship to constitute a glazing bar.

31 Claims, 11 Drawing Figures

METHOD AND CONSTRUCTION FOR A GREENHOUSE OR THE LIKE INCORPORATING SPLIT GLAZING BARS SUITABLE FOR CURVED SECTIONS

FIELD OF THE INVENTION

This invention relates to greenhouse constructions suitable for lean-to type greenhouse constructions such as solariums and the like and, more particularly, relates to constructions providing for prefabricated greenhouse constructions in the form of modules which are readily assembled at the site of installation.

BACKGROUND

Commercially available lean-to type greenhouse constructions are known to enable exquisite additions to homes and business structures while at the same time affording significant savings in fuel due to utilization of solar energy.

These constructions are provided for installation by professional installers and are also provided in kits which can be used by homeowners who wish to do their own installations.

Most commercially available units require at least a modest knowledge of mechanics as well as a fair amount of patience due to the fact that there are a large number of parts to be interconnected and due also to the fact that parts to be interconnected have to be matched.

Modular types of construction are known which tend to reduce requirements with respect installation time and cost. These construction techniques do not respond to the more sophisticated requirements of solarium construction, especially those which involve the use of curved glazing and curved glazing bar installations.

SUMMARY OF THE INVENTION

It is an object of the invention to provide improved structures and methods relating to the installation of greenhouse structures such as solariums and particularly such structures as involve the use of curved glazing and curved glazing bars.

It is a further object of the invention to provide improved structures and methods which minimize installation times at job sites and which facilitate installation by both professional and amateur personnel.

Yet another object of the invention is to provide improved structures and methods of the above noted type which minimize installation labor and cost attendant thereto thereby to result in a cost efficient product at generally lesser installation complexity.

As will be seen hereinbelow, a further object of the invention is to provide an improved structure wherein the abutting joints and fasteners are concealed and wherein curved glazing inclusive of curved tempered and insulated glass may be accommodated with no significant problem.

Still another object of the invention is to provide an improved greenhouse structure providing internal and external weep systems.

Other objects of the invention include providing greenhouse constructions in modular form to enable shipping the same in nesting relationship with minimized risk of damage to glazing and/or other parts and with a coding to enable simultaneously manufactured parts to be used together in cooperating relation in an installation.

In achieving the above and other objects of the invention, there is provided a greenhouse construction comprising at least first and second adjacent panels, each including a front wall section, a sloped roof section and a curved section between and connecting the wall and roof sections to form a continuous module. Each such panel or module is laterally bordered by glazing bar sections and further includes glazing extending between the glazing bar sections with the glazing being at least partly supported by the glazing sections and including at least one curved glazing section corresponding to and constituting, at least in part, the curved section of the associated panel. The glazing bar sections of each panel include front wall, sloped roof and interconnecting curved sections corresponding to what has been mentioned above. One of the glazing bar sections of the first of the aforesaid panels abuts one of the glazing bar sections of the second of these panels and is in mirror image and matched relationship. The glazing bar sections when in abutting relationship cooperatively constitute respective glazing bars. To form the abutting glazing bar sections there are provided matched curved sections which may be formed in various ways. One particularly unique way involves the sections being matched by being bent simultaneously by a common bending force. This force is preferably exerted with the sections in juxtaposition in a common bending die or the like. It should be noted that matched sections may also be prepared by separate bending. In any event, the glazing bar sections are preferably coded to indicate the matched relationship therebetween.

In accordance with a feature of the invention, the abutting glazing bar sections cooperatively define an interior chamber with the construction further including a splicing device in the chamber and a connecting device connecting the abutting glazing bar sections to the splicing device. The aforesaid chamber will, as shown in greater detail below, extend longitudinally through the abutting glazing bar section and the splicing device is a tubular member extending at least partly through this chamber. Preferably, in accordance with the invention, the tubular member mentioned above is hollow. In further accordance with the preferred embodiment of the invention, the tubular member and chamber have generally the same or similar configurations. The connecting device mentioned hereinabove may include bolts connecting respective of the abutting glazing bar sections to the tubular member.

In accordance with yet another feature of the invention, the abutting glazing bar sections define a plane of symmetry and include extensions extending in face-to-face relationship on opposite sides of this plane. These extensions cooperatively define a receptacle with the construction further including a cap device and coupling device accommodated in the receptacle to couple the cap device to the extensions. The cap device entraps respective of the glazing bar sections in the various modules. Moreover, there may be provided in accordance with the invention, a clip device to clip or clamp the aforesaid extensions together.

According to yet another feature of the invention, the cap device and glazing bar sections may be provided with facing sockets and there may be provided cushioning devices anchored in these sockets to cushion the glazing.

According to still another feature of the invention for erecting in lean-to mode against a supporting structure, there may be provided a ridge bar supported on the supporting structure and a base sill based from this supporting structure to support the panels in aligned relationship. The ridge bar and base sill are generally in parallel and space relationship with respect to each other.

According to yet another feature of the invention, there may be provided a ridge cap for each panel engaging the upper extremity of the glazing of the roof section of each panel and engaging with the ridge bar, with a device being provided for connecting the ridge cap to the glazing bar sections. Each of the ridge caps may include a flange and the above mentioned ridge bar may define a slot into which the flange hooks for the support of the panels.

Amongst other features of the invention is the feature whereby the ridge bar includes a longitudinally extending channel including a lower flange and a central rib including upper and lower rib extensions, the upper rib extension defining the aforesaid slot and the lower extension defining a second slot with a clip being provided which is attached to each glazing bar section and is trapped between the second slot and the lower flange mentioned above.

The results of the invention may also be envisioned as a greenhouse construction comprising continuous panels of like configuration including a curved section, said panels including glazing and glazing bar sections laterally bounding the glazing. Furthermore, the invention may be viewed as providing the glazing bar sections of contiguous and abutting relationship and cooperatively forming a glazing bar and including matching curved sectionsthese matching curved sections being formed according to one of a number of embodiments, by bending the glazing bar sections together. The panels all preferably have vertically disposed front sections and sloped sections connected by the curved sections. In addition, end walls may be provided bracketing the continuous panels. These end walls include continuous planar panels mounted in coplanar relationship and glazing bars including matching sections coupled to respect of the continuous panels to form modules.

According to other features of the invention, the glazing bar sections are in abutment in face-to-face relationship thereby defining grooves between the same, the invention providing devices to conceal the abutment. The glazing bar sections may moreover be provided with shade tracks.

As has been stated above, the invention also relates to methods. One method of the invention may be viewed as a method of fabricating a greenhouse structure with a vertically disposed front wall section, a sloped roof section and a curved section connecting the front wall and sloped roof sections, said method specifically comprising forming the greenhouse structure of prefabricated modules which are interconnected through the intermediary of glazing bars which support glazing in the modules and which are formed of sections which are first connected to respective of the modules and are then connected to each other in matching pairs to form the glazing bars.

According to other features of one of the methods of the invention as has been disclosed above, the glazing bar sections which are to be connected together may be matched by bending the same together and the sections may be matched by forming the same as mirror image sections and bending the same in juxtaposition with the same bending force in the same bending die.

As part of the method of the invention, the aforenoted glazing bar sections are formed to define cooperatively a longitudinally extending interior chamber, the method further including mounting a tubular member in the chamber and fastening the sections to the tubular member which serves as a splicing and/or splining member. The modules may further be aligned by mounting the same in a common ridge bar and a common base sill.

According to the method of the invention, the ridge bar is mounted on a supporting structure such as a building and the base sill is spaced from the supporting structure, the glazing bar sections being supported between the base sill and the ridge bar. The modules may be marked so that matched glazing bars sections can be connected together.

According to one of the various embodiments of the invention, the mirror image sections may be separated after they are bent together and these mirror image sections may be incorporated into different modules. As will be shown, the modules may be stacked in nesting relationship for shipment to the job site installation.

From what has been stated above, it will appear that the invention provides a method allowing assembly of pre-fabricated panels in a controlled factory environment, utilizing repetitive, economical factory help. It also provides a method allowing speedy erection of pre-fabricated panels in almost any type of weather. Even in the rain, a pre-fabricated panel can be erected and be watertight. This was not possible with previous construction methods. Still further the invention renders possible a method allowing total installation costs of a complete structure to be greatly reduced.

In addition to the above, the invention provides a method allowing for the elimination of cardboard and other packaging material used to box individual components and a method of construction allowing for fast, easy cycles of erection and dismantling the structure for use, for example, in exhibits and shows, as temporary or seasonal enclosures, etc. It provides moreover a method of construction minimizing costly on-site labor, and costly on-site construction delays.

Further, there is provided a method of construction allowing for substantial pre-assembly, thereby eliminating or minimizing the possibilities of missing or damaged parts usually found in a pre-fabricated kit structure. Additionally, there results a method of construction allowing for the pre-assembly of structure incorporating doors, windows, venting systems or shading systems which would normally involve costly, job delaying on-site labor. There results as well a glazed structure designed to permit shipping of pre-fabricated panels without damage to the glass or other alternative surface skin.

Other objects, features and advantages of the invention will be found in the detailed description which follows hereinafter as illustrated in the accompanying drawing.

DETAILED DESCRIPTION

The drawing illustrates preferred embodiments of the invention in accordance with which a modular system is provided for erecting a greenhouse structure with special provision being made for prefabricating the panels, bays or modules especially as regards the formation of the curved sections which are used intermediate the sloped roof sections and the front wall sections of the various panels or modules.

Figure 1:
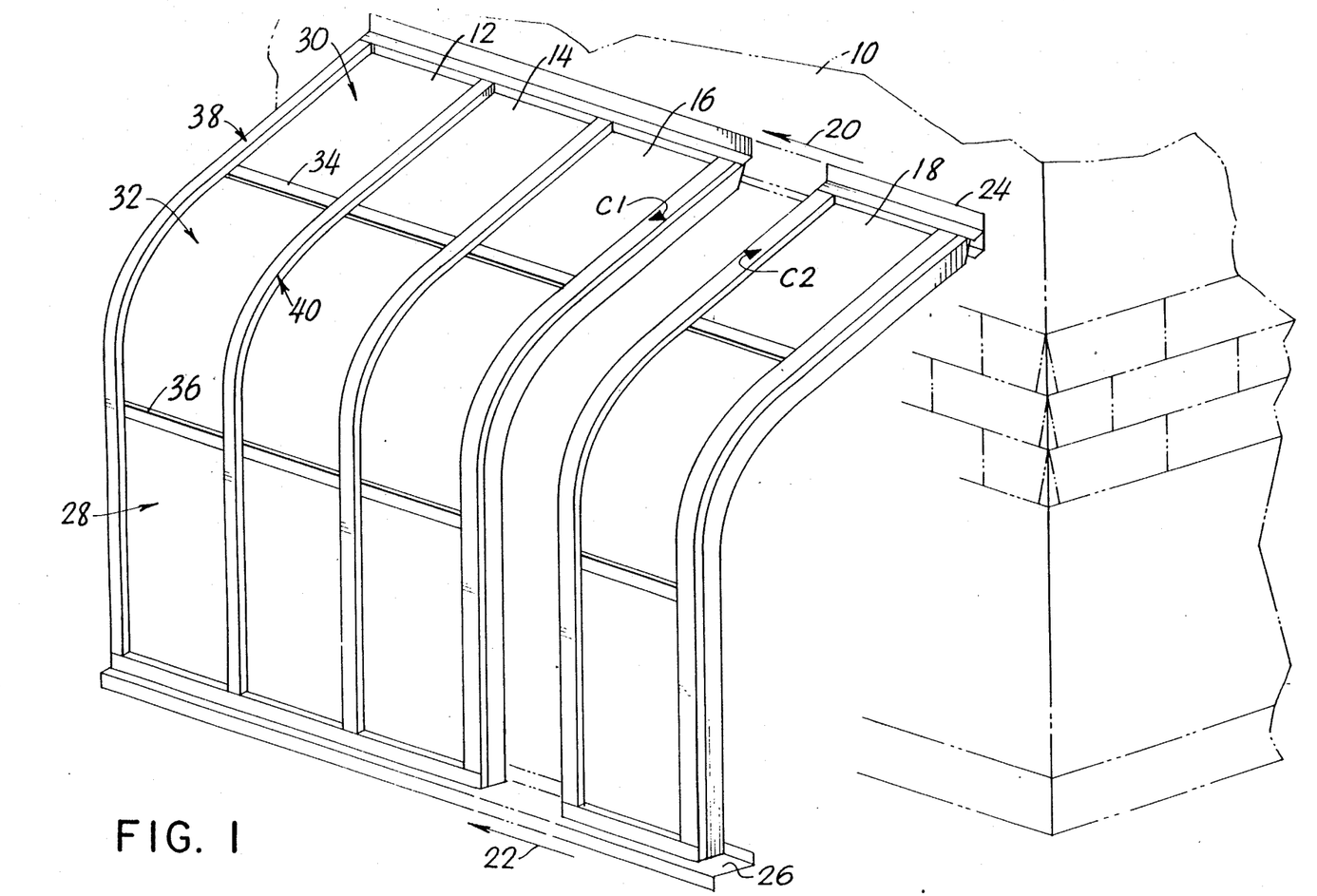
FIG. 1 is a diagrammatic perspective view showing a modular construction of the greenhouse or solarium construction embodying curved sections and modules in accordance with the invention.

In FIG. 1 is shown a supporting structure 10 which may be, for example, a dwelling or a business installation of any known construction. FIG. 1 shows a plurality of panels 12, 14, 16 and 18. Panel 18 is not yet assembled with the other panels(inclusive of panels 12, 14 and 16) which have previously been fastened together. Panel 18 is to be moved in the direction indicated by arrows 20 and 22 so that its glazing bar section (which is to be discussed in greater detail hereinunder)is brought into abutting relationship with the corresponding matched glazing bar section of panel 16 whereafter these two glazing bar sections are connected together to constitute a glazing bar, the abutment therebetween being concealed by a concealing member to be discussed in greater detail hereinbelow.

To enable the mounting of the various panels there is provided a longitudinally extending and continuous ridge bar 24. This ridge bar has various features to be described hereinbelow. Its purpose is to cooperate with base sill 26 to provide supporting elements for the glazing bars so that the glazing bars can be installed in appropriate posture. For this purpose the ridge bar 24 is mounted against the supporting structure 10 and is in horizontal attitude or, in other words, is parallel to the ground. At the same time, the base sill 26 is parallel to the ridge bar 24 and is mounted in a position whereat it is spaced from the supporting structure 10.

Each panel is provided in the illustrated embodiment with three sections, namely a front wall section 28, a sloped roof section 30 and an intermediate curved section 32 which serves to connect the vertically disposed front wall section 28 with the sloped roof section 30. The intermediate curved section 32 merges with sections 28 and 30 and forms a unitary panel therewith taking into consideration the additional elements which are also included in each panel. Thus, for example, there are provided cross muntins 34 and 36 and glazing bars 38 and 40, the constructions of which will become apparent hereinbelow.

Figure 2:
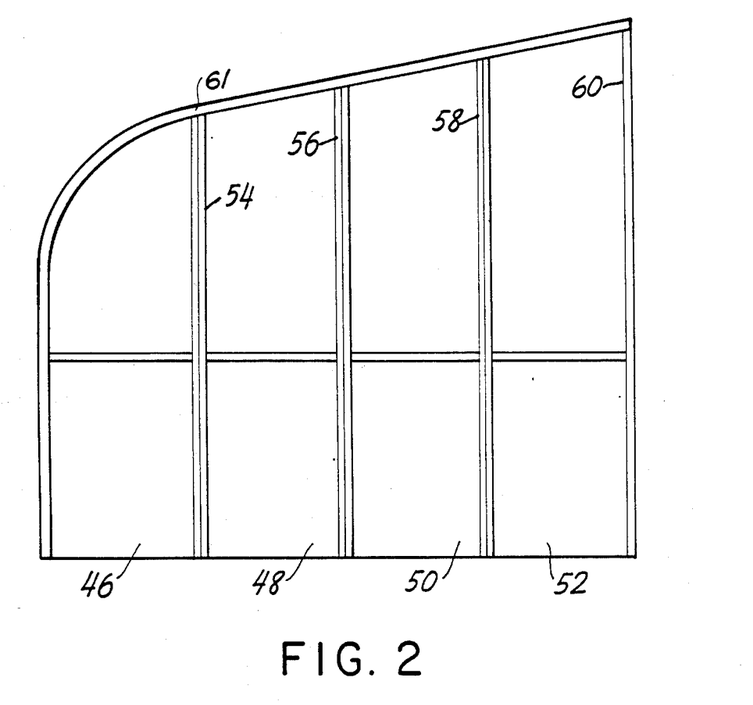
FIG. 2 is a diagrammatic view of an end wall construction suitable for use in the construction of FIG. 1 in which the end wall of FIG. 2 would be used in duplicate.

The greenhouse or solarium construction of the invention is moreover provided with two end walls which may be constructed as illustrated in FIG. 2. These end walls are intended to bracket the assembled panels 12, 14, 16 and 18 and to constitute end walls with respect to the enclosure defined by the aforesaid panels. It is to be noted that the structure illustrated in FIGS. 1 and 2 is diagrammatic in nature only and that there are no details set forth therein. Thus, for example, the end wall illustrated in FIG. 2 is provided with glazing 46, 48, 50 and 52 with this glazing being separated by glazing bars 54, 56, 58 and 60 and being framed by 61. The construction of the glazing bars 54, 56, 58 and 60 is similar to that to be discussed hereinbelow and, hence, no detail will be described at this time. However, it should be noted that the end walls and other panels may be supplied with power venting systems, windows and doors as may be required for any custom design system and the absence of such features is not to be considered limiting of the present invention in any respect.

Figure 3:
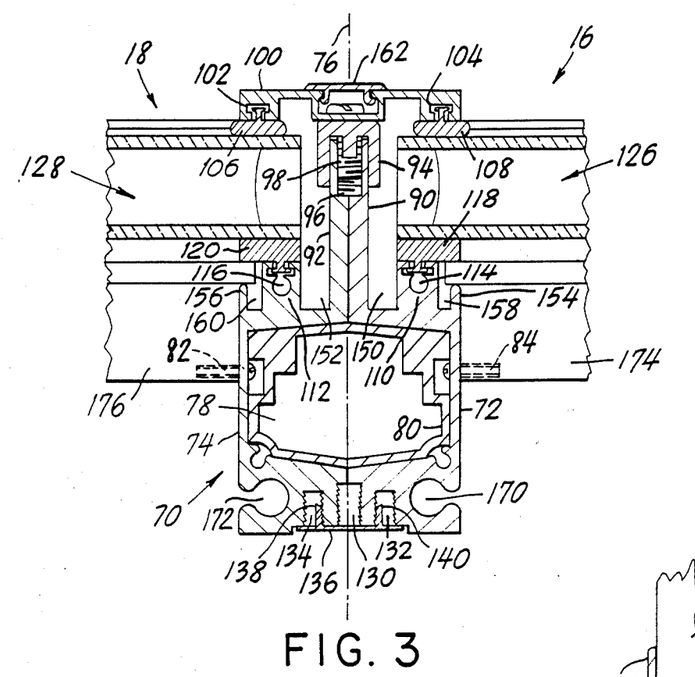
FIG. 3 is a fragmentary cross-sectional view, partly broken away, of matching glazing bar sections joined in a unit to form a glazing bar to support glazing panes.

FIG. 3 illustrates the joining of panels 16 and 18 when the glazing bar sections thereof have been brought into contact and engaged to constitute the glazing bar 70 (equivalent e.g., to bar 40). In FIG. 3 can be seen glazing bar section 72 and glazing section 74. These two glazing bar sections have been manufactured in order to provide the bend therein simultaneously and in identical fashion as discussed in greater detail hereinbelow.

It will be noted that these sections are symmetrical with one another and that therefore these sections 72 and 74 are in mirror image relationship with one another. Cooperatively they define a plane of symmetry indicated at 76.

The main bodies of sections 72 and 74 cooperatively define an interior chamber indicated at 78. This interior chamber is intended to accommodate the tubular member 80 which constitutes a splicing or splining device for the tube sections 80 and which aligns the same. It will be noted that the outer profile of the tubular member 80 corresponds with the profile of the chamber 78. The tubular member 80 is moreover a longitudinally extending member which fits in the chamber 78 which extends throughout the length of the associated sections. Member 80 may be one of a number of such members which are spaced along the chamber 78 or may be elongated to extend along relatively long portions of the chamber or along the entire chamber.

A pair of connecting devices are shown in FIG. 3. These connecting devices are indicated at 82 and 84. These connecting devices are bolts or the like which are accommodated in threaded receptacles provided in respective glazing bar sections 72 and 74. It will be appreciated that such connecting devices will be distributed longitudinally along the lengths of the respective glazing bar sections 72 and 74 as required. It will be noted that this splicing arrangement is what generally maintains the sections 72 and 74 in face-to-face abutting relationship, although other connections are available and are furthermore possible in addition to devices such as bolts 82 and 84.

The glazing bar sections 72 and 74 are provided with extensions 90 and 92 which are planar elements symmetrical about the plane of symmetry 76 and which are in face-to-face relationship. They are maintained in face-to-face relationship not only by the operation of bolts 82 and 84, but also by means of a plastic or metal clip such as indicated 94. Cooperatively, extensions 90 and 92 define a threaded receptacle 96 which accommodates a bolt or screw 98 which connects to the extensions 90 and 92 a cap indicated at 100. This cap is provided with sockets 102 and 104 in which are accommodated cushions 106 and 108. These cushions are formed, for example, of glazing cord which are cushions which may readily be compressed to perform the function indicated hereinbelow.

Sections 72 and 74 are moreover provided with extensions 110 and 112 within which are provided sockets 114 and 116. These sockets serve to anchor cushions 118 and 120 which are in spaced and facing relationship relative to cushions 106 and 108. These cushions serve to entrap glazing 126 and 128 therebetween and, as a consequence, the glazing which is illustrated is affixed to the glazing bar 70.

Glazing bar 70 is moreover provided with threaded receptacle 130 as well as threaded receptace 132 and 134. These threaded receptacles provide for a number of functions and in general for the connection of various ancillary features which may be provided within the greenhouse constructions. Thus, for example, a picture frame may be mounted by means of a bolt accommodated ih threaded receptacle 130. However, it will be noted that there is moreover provided a clip 136. This clip has prongs 138 and 140 serving to be accommodated in receptacles 132 and 134. The clip 136 may thus function to assist in holding the glazing bar sections 72 and 74 together as a consequence of which the action of bolts 82 and 83 as well as of clip 94 is supplemented.

The extensions 90 and 92 define with extensions 110 112 gutters 150 and 152 respectively. These gutters serve as internal weeps for the drainage of accumulated moisture. At the same time there are provided external flanges 154 and 156 defining gutters 158 and 160 which serve as external weeps for the drainage of moisture accumulating on the exterior of extensions 110 and 112.

The cap 100 serves to conceal the line or seam of abutment between sections 90 and 92. At the same time, there is provided a cap 162 which serves to conceal the head of bolt 98. Clip or cap 136 serves to conceal the line or seam of abutment between sections 72 and 74 at the bottom of FIG. 3 and thus these elements contribute significantly to the beauty of the design. It is also to be noted that sections 72 and 74 are respectively provided with shade tracks 170 and 172. The function of the shade tracks is to accommodate the bulbous peripheries of the associated sections as described in detail in copending application Ser. No. 613,339 filed 5/23/84 (now U.S. Pat. No. 4,606,157).

With further reference to FIG. 3 there is to be noted cross muntins 174 and 176 which perform a function and which are installed as described in detail hereinbelow. It will be noted that the glazing panels illustrated in FIG. 3 may be made of plastic or may be for example of ⅜ inch insulated tempered glass. The size of the glass or the material of which the glazing is made is not a limitation of the instant invention.

Figure 4:
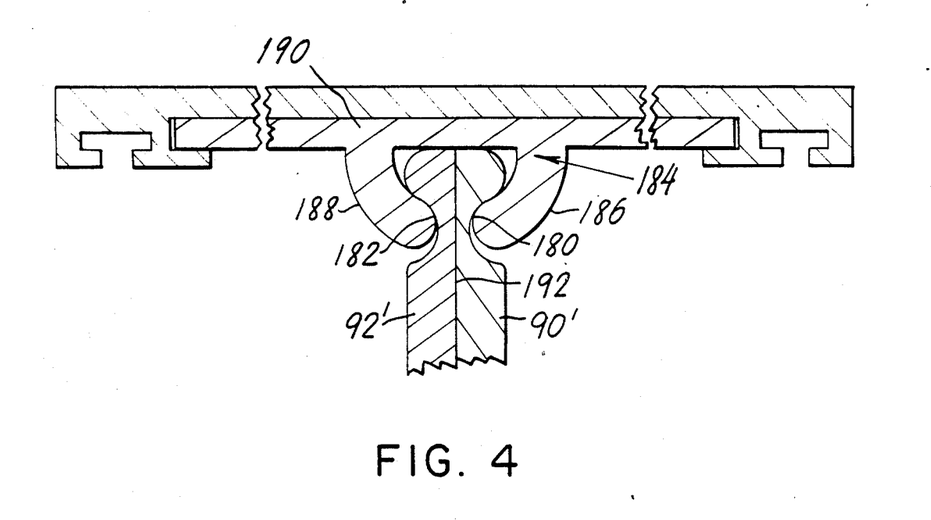
FIG. 4 is a fragmentary detail of FIG. 3 shown in revised form to constitute another embodiment of the invention.

A variation of the embodiment of the invention of FIG. 3 is illustrated in FIG. 4 where are shown equivalents to the extensions 90 and 92. These equivalents are indicated at 90' and 92'. These are provided with grooves 180 and 182 and a plastic cap 184 (serving as a thermal break) is provided having fingers 186 and 188 extending therefrom and accommodated at their outermost extremities in the grooves 180 and 182. Thus the extensions 90' and 92' are held together by the clip arrangement formed by fingers 186 and 188 supported on a base 190 which serves the purpose of concealing the line of abutment of 192 which exists between extensions 90' and 92' and thus between glazing sections 72 and 74. A metal or plastic part 191 is engaged on cap 184 and serves the function of part 100 in FIG. 3.

Figure 5:
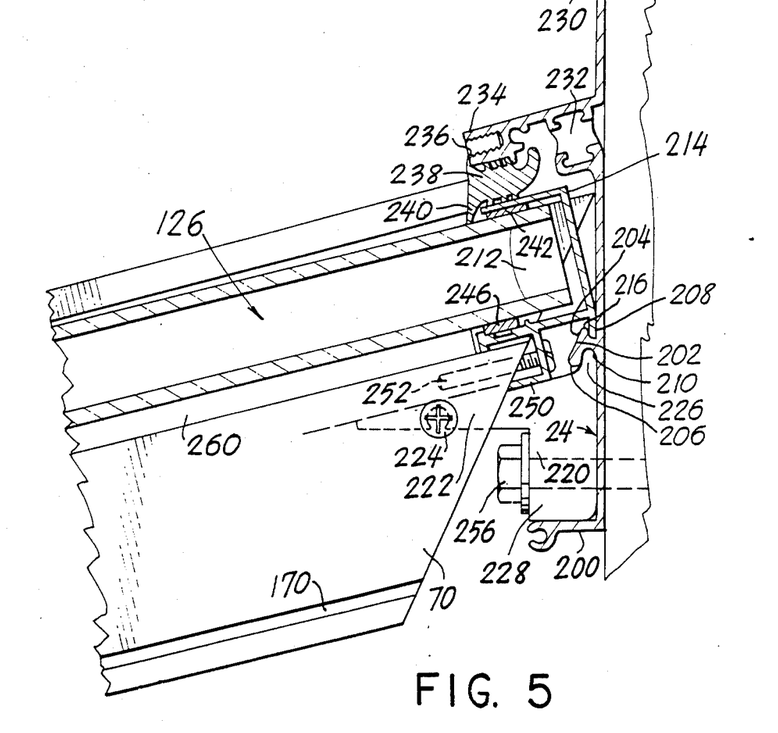
FIG. 5 is a side view partially in section and partially broken away to illustrate the connection of a panel to a ridge bar in accordance with the invention.

The support of glazing 126 with respect to the ridge bar 24 mounted on supporting structure 10 and associated with glazing bar 70 is shown by way of example in FIG. 5. Therein it will be seen that the ridge bar 24 includes a lower flange 200 and a central rib 202. The central rib has an upper extension 204 and a lower extension 206. The upper extension 204 defines a groove 208. The lower extension 206 defines a downwardly open groove 210.

The upper extremity 212 of glazing 126 is provided with a bay ridge or ridge cap 214 in the form of a continuous channel preferably the width of the glazing of the panel. This ridge cap is in the form of a channel having, extending from a corner thereof, the flange 216. Flange 216 is accommodated within or hooked into the groove 208 thereby to form a support in part for the weight of the glazing 126. An additional part of the weight of the glazing is supported by the glazing bar 70 with respect to which there is provided a clip 220. The clip 220 has a tongue 222 which is fastened by means of a screw 224 to the glazing bar 70. The clip also includes a tongue 226 which is accommodated in the groove 210 provided by the extension 206 on rib 202 of the ridge bar 24. The bottom portion 228 of the clip rests against the flange 200 with the tongue 226 being accommodated in groove 210 whereby a hooking engagement between the glazing bar 70 and the ridge bar 24 is provided.

The ridge bar 24 moreover comprises a section 230 connected to the main body of ridge bar 24 by means of a plastic insert 232 constituting a thermal break. Section 230 includes a flange 234 having a tongue 236 thereon which traps against the cap 214 a gasket member 238 which includes a tongue 240 pressing up against the glazing 126. In addition, the glazing 126 is insulated from contact from metal by insulating ribbons 242 and 246.

It will be noted that the cap 214 is provided with an extension 250 by which a direct connection is afforded with glazing bar 70 through a coupling device 252 which may be a bolt or screw or the like. Attachment of the ridge bar 24 with supporting structure 10 is diagramatically indicated by the provision of a bolt 256.

It will be noted that there is no fixed connection of the glazing 126 with the ridge bar 24 which does not provide a sliding longitudinal movement with respect to the ridge bar 24 all as enabled by the engagement of flange 216 in groove 208. In FIG. 5 provision of shade track 170 will also be noted as well as glazing cord 260 the purpose of which is to provide for the supporting of the weight of glazing 126 without there being direct contact between this glazing and the glazing bar 70.

Figure 6:
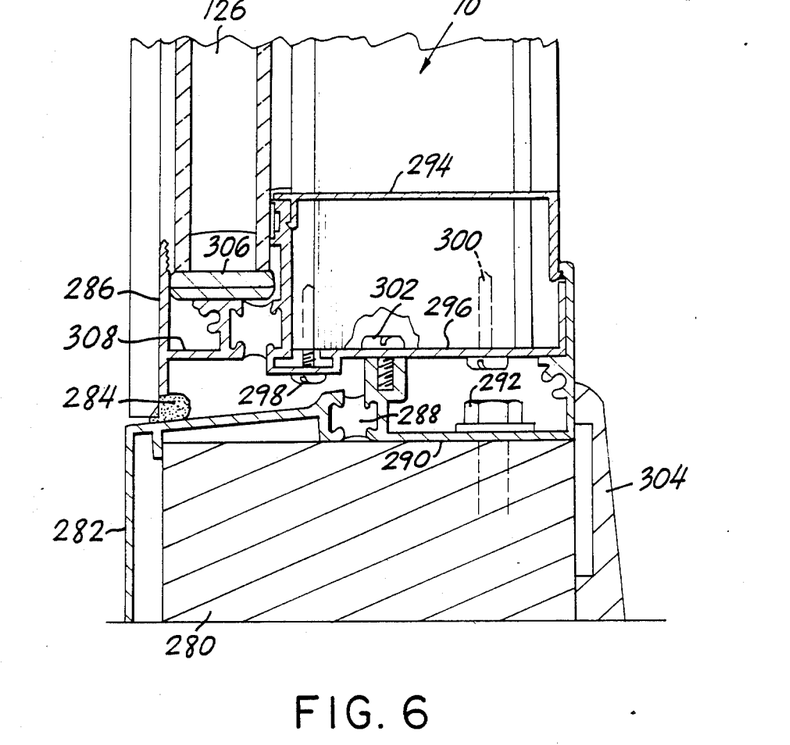
FIG. 6 is a side view partially in section and partially broken away of the base sill employed with the construction of the invention.

As to the base sill providing a support for the panels or modules of the invention, this is illustrated in FIG. 6. In FIG. 6 is shown a wooden beam which may be treated two by four as indicated at 280. A continuous sill is indicated at 282 with a caulking being indicated at 284 with respect to cap 286 which is provided at the bottom of the respective panels. Element 282 is provided with thermal break element 288 whereby connection is made with another section of the continuous sill indicated at 290. Element 290 is connected to block 280 by means of bolt 292, a plurality of which may be provided.

A sill trim element is indicated at 294. Base sill 296 is connected by means of bolt 298 to the end of the glazing bar. Glazing bar 70 is illustrated by way of example along with glazing 126. Connection between element 296 and the end of glazing bar 70 is also indicated in the form of a bolt or screw 300. Element 296 is furthermore connected to element 290 by means of bolt or screw 302. A wood trim concealing the mechanical interior of the device may be provided in the form of wood trim 204. At least some of the weight of the glazing 126' is supported on setting blocks indicated at 306, these being supported on flange 308 constituting an extension from element 286.

Figure 7:
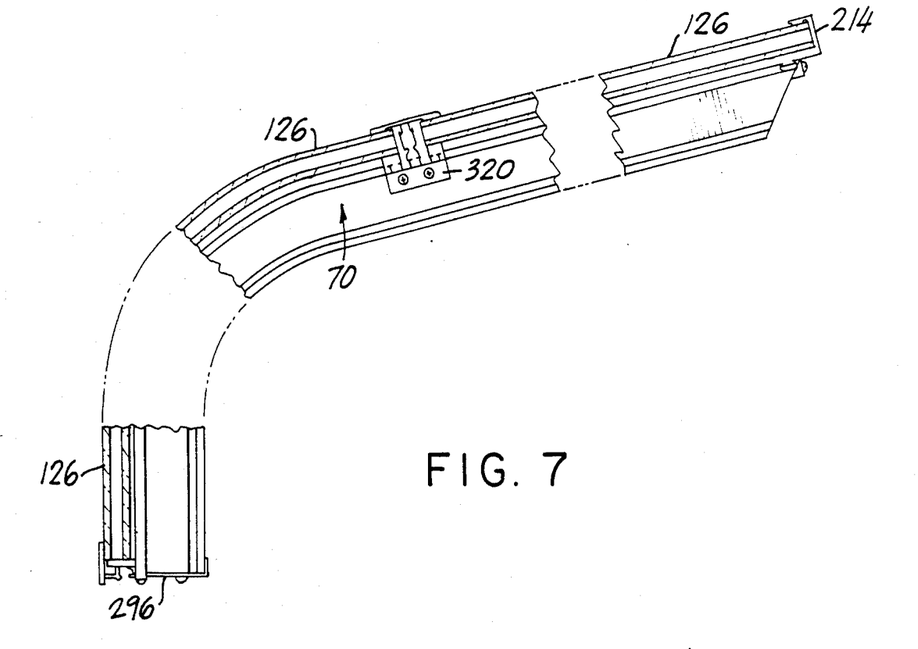
FIG. 7 is a side view partially broken away of a glazing bar illustrating how the glazing bar is accommodated in a ridge bar and in a base sill and showing further a cross muntin which may be embodied in a preferred version of the invention.

Various of the above-identified elements are shown in cooperation in FIG. 7 wherein is illustrated by way of example the glazing bar 70. Therein may be seen the cap 214 (see also FIG. 5) and base sill element 296 (See also FIG. 6). The glazing 126 is also visible in FIG. 7. Another element which is yet to be described in detail appears in the form of cross muntin 320. This corresponds to the cross muntins 34 and 36 in FIG. 1.

Figure 8:
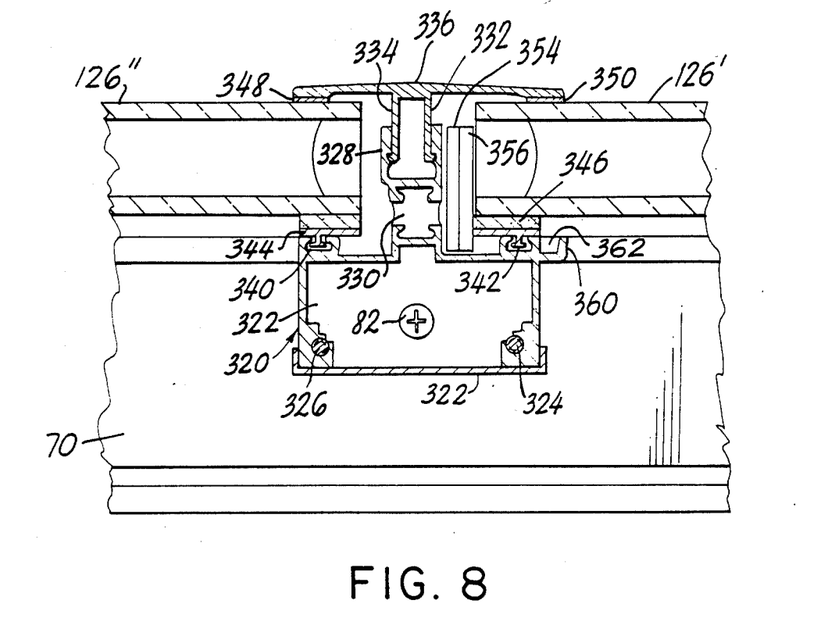
FIG. 8 shows on enlarged scale the cross muntin arrangement seen in Fig. 7.

The cross muntin 320 is also shown in FIG. 8 wherein appears the head of, for example, bolt 82 (see also FIG. 3). In FIG. 8, it can be seen that cross muntin 320 is provided with a bottom cap plate 322. Also provided are bolts 324 and 326 which connect glazing bar 70 to cross muntin 320 from within chamber 78 (see FIG. 3) through pre-drilled holes in the side of the glazing bar 70. The cross muntin 320 is separated from a mounting structure 328 by means of a thermal break element 330. The mounting structure 328 is intended to receive by way of a snap fit prongs 332 and 334 of a snap-on muntin cap 336 the purpose of which is to conceal the gap between glazing sections 126' and 126''.

The cross muntin 320 is also provided with sockets 340 and 342 which accommodate cushions 344 and 346. Cap 336 is provided with cushions 348 and 350, all of these cushions entrapping the glazing 126' and 126'' thereby to yieldingly provide support for the same.

Setting blocks 354 and 356 may be provided at the end of each of the glazing panels. These two blocks are shown by way at the edge of glazing panel 126 by way of example.

As a further feature of the construction of the invention cross muntin 320 is provided with a flange 360 defining a groove 362 serving as a condensation drain which weeps into the corresponding glazing bar drain for purposes of moisture removal.

Figure 9:
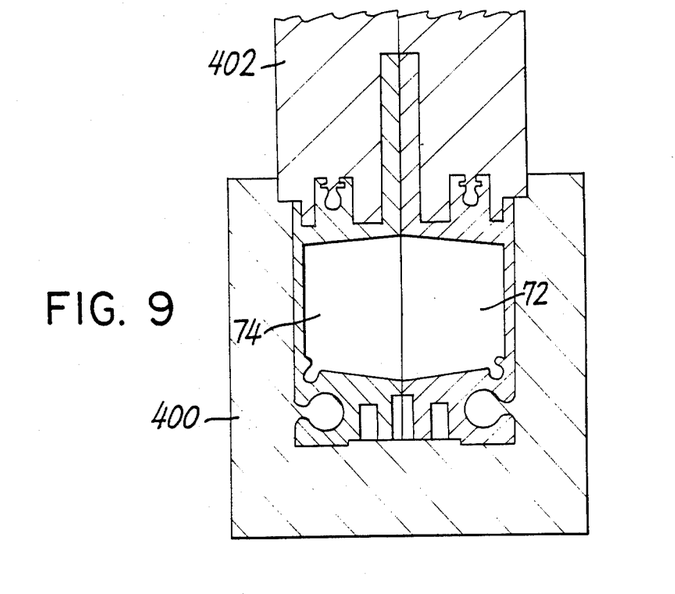
FIG. 9 is a diagrammatic view which diagrammatically illustrates the bending of matching glazing sections in accordance with one embodiment of the invention.
Figure 10:
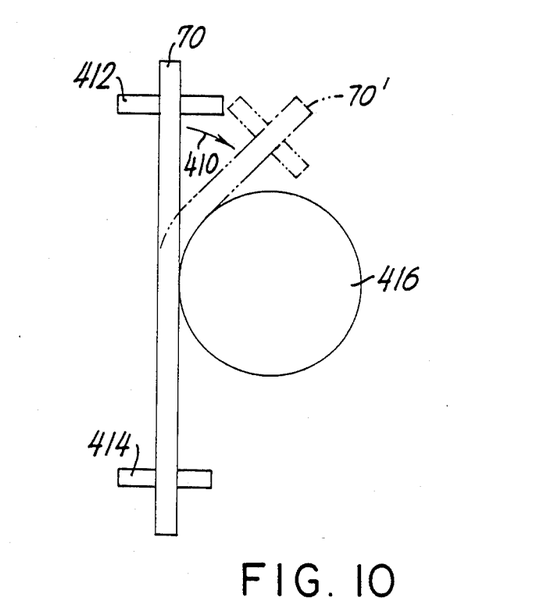
FIG. 10 is a further diagrammatic view illustrating the bending of matching glazing bar sections in accordance with one embodiment of the invention.

In the generalized description of the invention which appears hereinabove, reference has been made to the fact that the glazing bar sections of the various glazing bars (see for example glazing bar 70) are prepared in such a way as to provide an effective correspondence of configuration between these sections. Thus, for example, the method of the invention is a method of fabricating a greenhouse structure preferably with a vertically disposed front wall section, a sloped roof section and a curved section connecting the front wall and sloped roof sections. This method more particularly comprises forming the greenhouse structure of prefabricated modules which are interconnected through the intermediary of glazing bars which support glazing in the modules and which are formed of sections which are first connected to the respective modules and then are connected to each other in matching pairs to form the glazing bars. It has been noted that the glazing bar sections which are to be connected together may be matched by bending the same together. The purpose of this feature, when it is employed, is to make sure that no variation is introduced by separately manufacturing the glazing bar sections so that they do not connect together appropriately. More particularly this is accomplished by forming the sections as mirror image sections and bending the same in juxtaposition with the same bending force in the same bending die. This feature of the invention is generally indicated in digrammatic fashion in FIG. 9 where are seen die sections 400 and 402. Therein are defined cavity section 404 for receiving the glazing bar sections 72 and 74 so that these sections are held in juxtaposition and are entrapped in such a manner that the bending force may be applied as a unitary force in a single bending die. The bending force is indicated diagrammatically by arrow 410 in FIG. 10 wherein it is seen that the two sections are clamped together by clamps 412 and 414 to be bent around a mandril 416 thus moving from the position indicated at 70 to the position indicated at 70' thereby to form a glazing bar having a vertical section, a sloped roof section and a curved section all as has been diagrammatically indicated in the illustration of the greenhouse construction set forth in FIG. 1.

Figure 11:
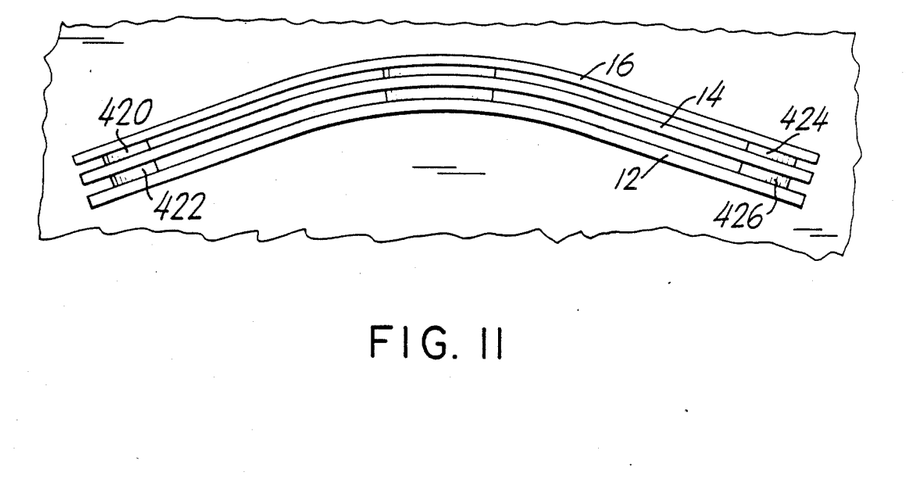
FIG. 11 diagrammatically illustrates the arrangement of the plurality of glazing bars in nesting relationship enabling the associated members or modules to be readily transported to a job site.

As a further feature of the invention it has been indicated that the glazing bars and thus the panels may be packed in nesting relationship thereby to be transferred from the site of prefabrication to the job installation at which installation is to take place. This is illustrated in FIG. 11. In FIG. 11 are illustrated by way of example panels 12, 14 and 16 with their corresponding glazing and glazing bars all bent to the same profile so to have the vertical front wall section sloped roof section and intervening or intermediate curved section all as has been noted hereinabove. In FIG. 11 the panels 12, 14 and 16 (and as many other panels as may be necessary) are packed with spacers such as indicated for example at 420, at 422, 424 and 426. These thusly nested panels or modules may be readily tranported with economy of space and free from damage to the site at which installation is to be made. To be certain that appropriate glazing bar sections will be connected to one another in accordance with their unitary manufacture the matched glazing bar section may be provided with a coding representation. A color coding is indicated by way of example in FIG. 1 at C1 and C2. This coding may take the form of appropriate color printing on the matching sections so that matching sections may be readily identified and put into cooperating relationship.

From the above it will be seen that the method of the invention comprises forming a greenhouse structure of prefabricated modules which are interconnected through the intermediary of glazing bars which support glazing in the modules and which are formed of sections which are first connected to the respective modules and are then connected to each other in matching pairs to form the glazing bars. The glazing bar sections which are to be connected together may be matched by bending the same together and are formed preferably as mirror image sections which are bent in juxtaposition with the same bending force in the same bending die. The sections are formed to define cooperatively a longitudinally extending interior chamber in which is mounted a tubular member to which the sections are fastened. The modules are aligned by mounting the same in a common ridge bar and base sill which are appropriately positioned.

More particularly the ridge bar of the invention is preferably mounted on a supporting structure such as a building or the like with the base sill being spaced from the supporting structure. The glazing bar sections are installed between the base sill and ridge bar and are connected together in the manner indicated. The matching is facilitated as noted above by marking the modules so that matched glazing bar sections can be connected together. To enable the above, the mirror image sections of the glazing bars are separated after they are collectively bent in the same die and the separated mirror image sections are incorporated into different modules. The modules may as noted above be stacked in nesting relationship for shipment to a job site for installation.

There will now be obvious to those skilled in the art many modifications and variations of the methods and construction set forth hereinabove. These modifications and variations will not depart from the scope of the invention if defined by the following claims.

What is claimed is:

1. A greenhouse construction comprising at least first and second adjacent panels each including a front wall section, a sloped roof section, and a curved section between and connecting said wall and roof sections to form a continuous module, each said panel including and being laterally bordered by glazing bar sections and further including glazing extending between said glazing bar sections, the glazing being at least partly supported by the glazing bar section and including a curved glazing section corresponding to and constituting at least in part the curved section of the associated panel, the glazing bar sections of each panel including front wall, sloped roof and interconnecting curved sections, one of the glazing bar sections of the first of said panels abutting one of the glazing bar sections of the second of said panels and being in mirror image and matched relation therewith, the abutting glazing bar sections cooperatively constituting respective glazing bars.

2. A greenhouse construction as claimed in claim 1 wherein the abutting glazing bar sections include matched curved sections.

3. A greenhouse construction as claimed in claim 2 wherein the abutting glazing bar sections are coded to indicate the matched relation therebetween.

4. A greenhouse construction as claimed in claim 2 wherein the abutting glazing bar sections cooperatively define an interior chamber, said construction further including a splicing means in said chamber and connecting means connecting the abutting glazing bar sections to said splicing means.

5. A greenhouse construction as claimed in claim 4 wherein said chamber extends longitudinally through the abutting glazing bar sections and the splicing means is a tubular member extending at least partly through said chamber.

6. A greenhouse construction as claimed in claim 5 wherein the tubular member is hollow.

7. A greenhouse construction as claimed in claim 5 wherein the tubular member and chamber have generally similar configuration.

8. A greenhouse construction as claimed in claim 5 wherein the connecting means includes bolts connecting respective of the abutting glazing bar sections to the tubular member.

9. A greenhouse construction as claimed in claim 4 wherein the abutting glazing bar sections define a plane of symmetry and include extensions extending in face-to-face relation on opposite sides of said plane, said extensions cooperatively defining a receptacle, said construction further comprising a cap means and coupling means accommodated in said receptacle to couple the cap means to said extensions, the cap means entrapping respective of said glazing against respective of said glazing bar sections.

10. A greenhouse construction as claimed in claim 9 comprising clip means to clamp said extensions together.

11. A greenhouse construction as claimed in claim 9 wherein said cap means and glazing bar sections define facing sockets, comprising cushioning means anchored in the sockets to cushion the glazing.

12. A greenhouse construction as claimed in claim 2 for erection in lean-to mode against a supporting structure, comprising ridge bar means supported on said supporting structure and base sill means spaced from said supporting structure to support the panels in aligned relation, said ridge bar means and base sill means being in generally parallel and spaced relation with respect to each other.

13. A greenhouse construction as claimed in claim 12 comprising ridge cap means for each panel engaging the upper extremity of the glazing of the roof section of each panel and engaging with said ridge bar means, and means for connecting the ridge cap means to said glazing bar sections.

14. A greenhouse construction as claimed in claim 13 wherein each of the ridge cap means includes a flange and said ridge bar means defines a slot into which said flange hooks for the support of said panels.

15. A greenhouse construction as claimed in claim 14 wherein said ridge bar means includes a longitudinally extending channel including a lower flange and a central rib including upper and lower rib extensions, the upper rib extension defining said slot, the lower extension defining a second slot, said construction further including a clip attached to each glazing bar section and trapped between the second slot and lower flange.

16. A greenhouse construction comprising contiguous panels of like configuration including a curved section, said panels including glazing and glazing bar sections laterally bounding the glazing, the glazing bar sections of contiguous panels being in abutting relation and operatively forming a glazing bar and including matching curved sections.

17. A greenhouse construction as claimed in claim 16 wherein the matching curved sections are formed by bending the glazing bar sections together.

18. A greenhouse construction as claimed in claim 16 wherein the panels have vertically disposed front wall sections and sloped roof sections connected by the curved sections.

19. A greenhouse construction as claimed in claim 18 further including end walls bracketing said contiguous panels, said end walls including contiguous planar panels mounted in coplanar relationship and glazing bars including matching sections coupled to respective to the contiguous panels to form modules.

20. A greenhouse construction as claimed in claim 16 wherein the glazing bar sections are in abutment in face-to-face relation, comprising means to conceal the abutment.

21. A greenhouse construction as claimed in claim 16 wherein said sections are provided with shade tracks.

22. A method of fabricating a greenhouse structure with a vertically disposed front wall section, a sloped roof section and a curved section connecting the front wall and sloped roof sections, said method comprising forming the greenhouse structure of prefabricated modules which are interconnected through the intermediary of glazing bars which support glazing in the modules and which are formed of sections which are first connected to the respective modules and are then connected to each other in matching pairs to form the glazing bars.

23. A method as claimed in claim 22 wherein the glazing bar sections which are to be connected together are matched by bending.

24. A method as claimed in claim 23 wherein the sections are matched by bending the same as mirror image sections.

25. A method as claimed in claim 24 comprising separating the mirror image sections after they are bent together and incorporating the same into different modules.

26. A method as claimed in claim 25 comprising stacking the modules in meshing relation for shipment to a site for installation.

27. A method as claimed in claim 24 comprising bending the sections in juxtaposition with the same bending force in the same die.

28. A method as claimed in claim 22 comprising forming the sections to define cooperatively a longitudinally extending interior chamber, mounting a tubular member in the chamber, and fastening the sections to the tubular member.

29. A method as claimed in claim 22 comprising aligning the modules by mounting the same in a common ridge-bar and base sill.

30. A method as claimed in claim 29 comprising mounting the ridge bar on a supporting structure, spacing the base sill from the supporting structure, and supporting the glazing bar sections between the base sill and ridge bar.

31. A method as claimed in claim 22 comprising marking the modules so that matched glazing bar sections can be connected together.

* * * * *